Jan. 28, 1969     E. F. FELSTEHAUSEN     3,424,294
COUNTER FOR FOOD MOLDING MACHINE
Filed May 8, 1967                               Sheet _1_ of 8
FIG_1
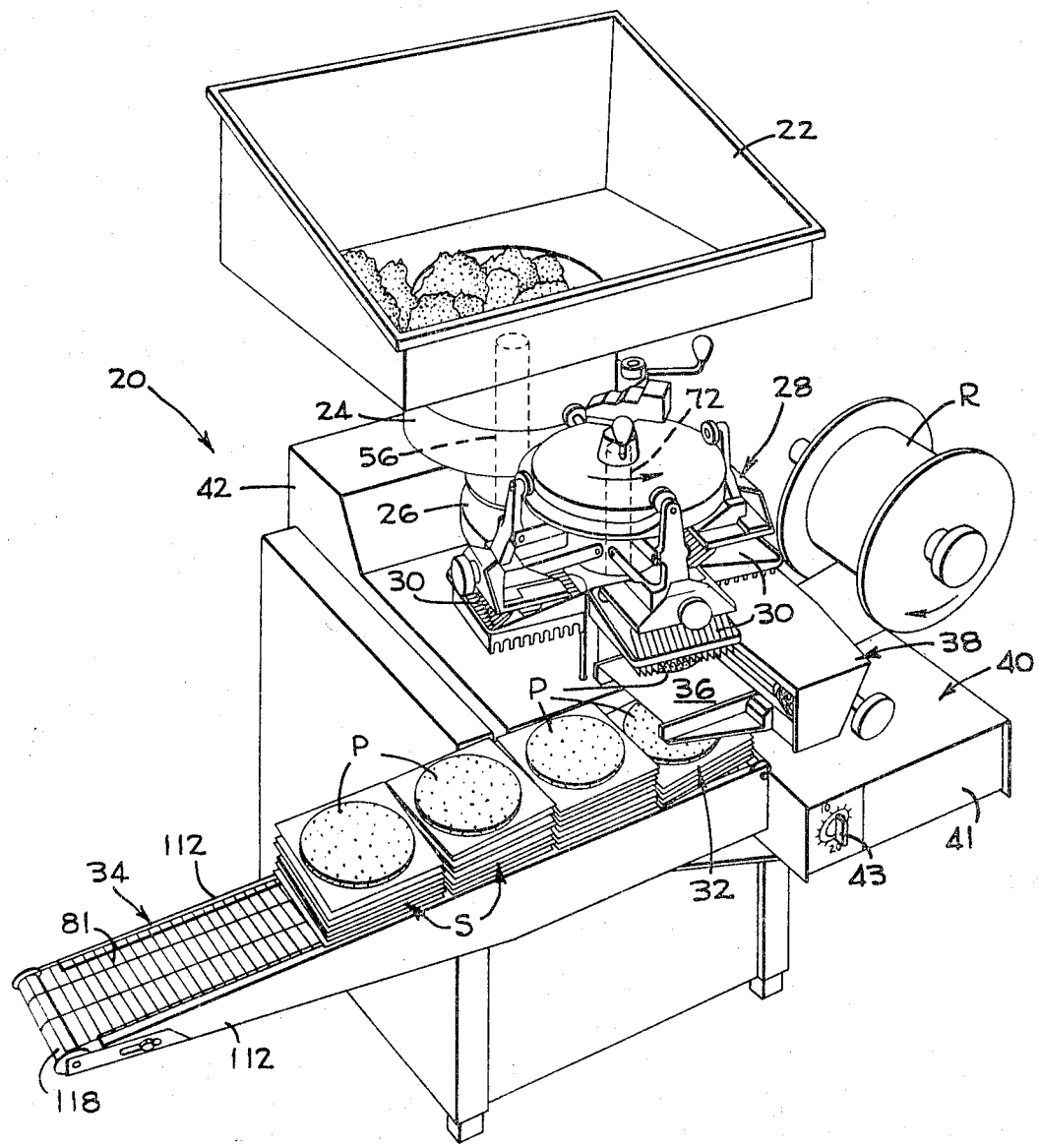
INVENTOR.
EUGENE F. FELSTEHAUSEN
BY
*Francis W. Anderson*
ATTORNEY

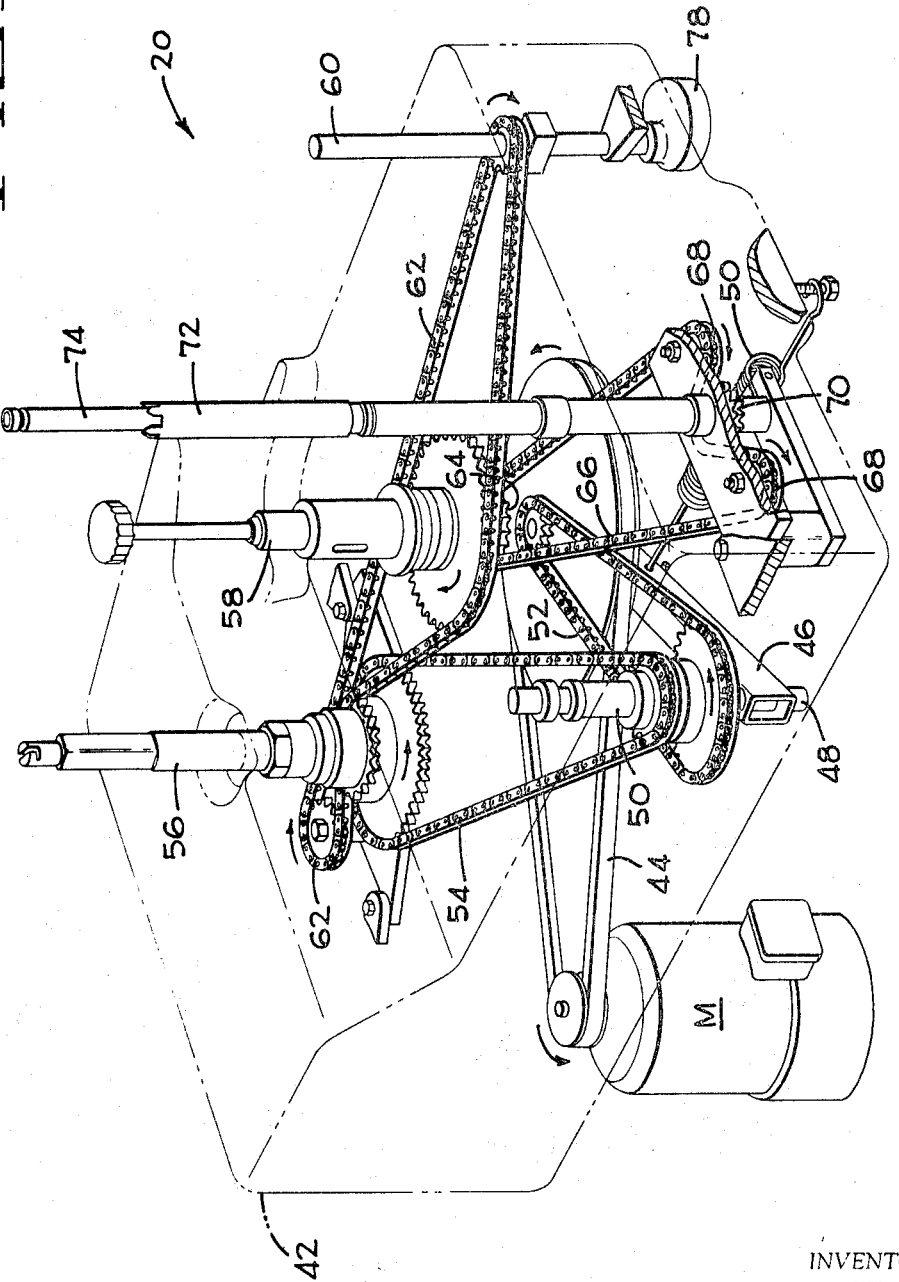

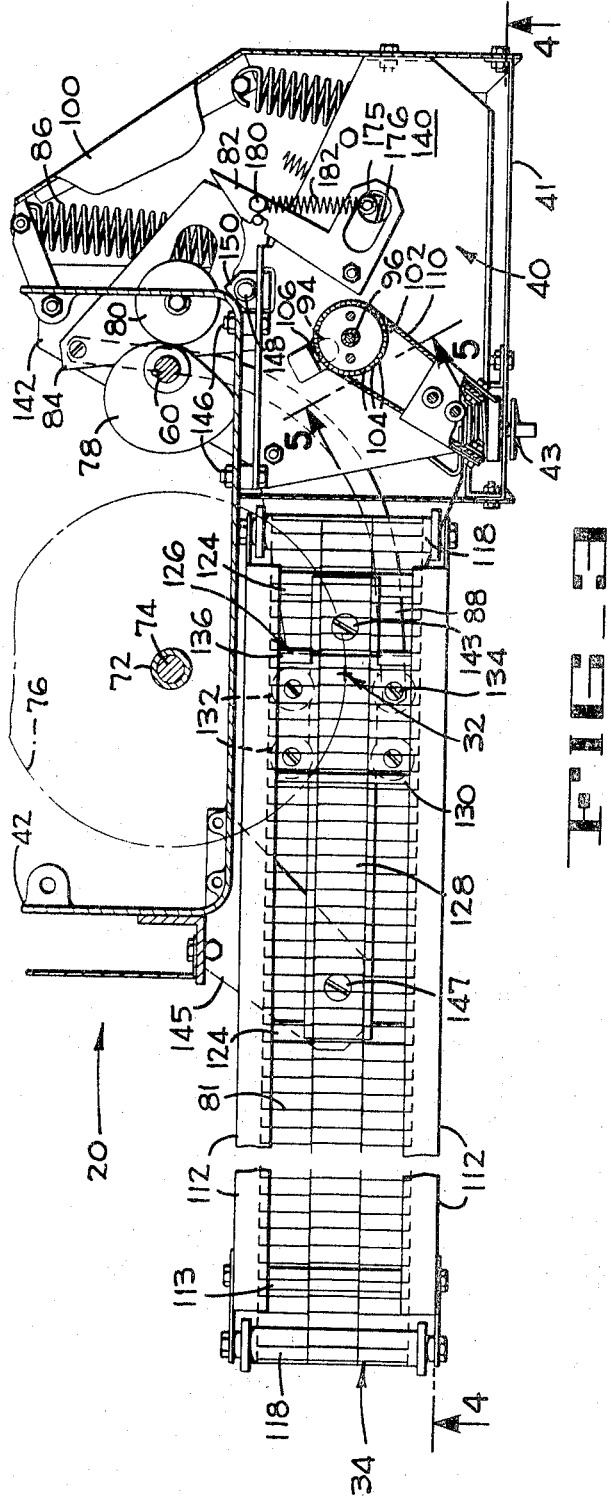
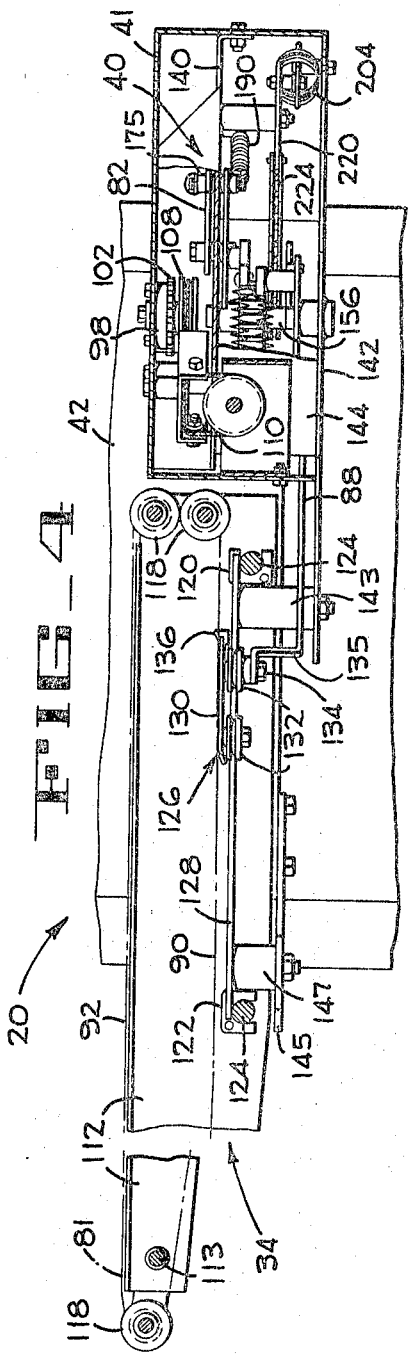

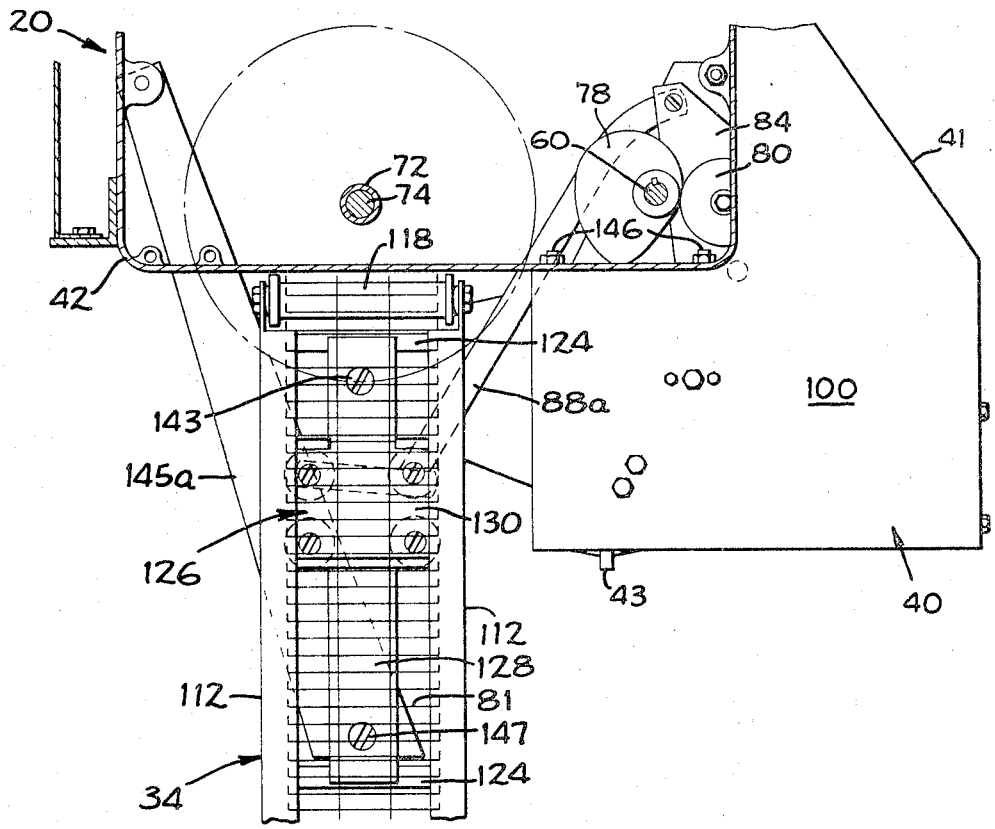

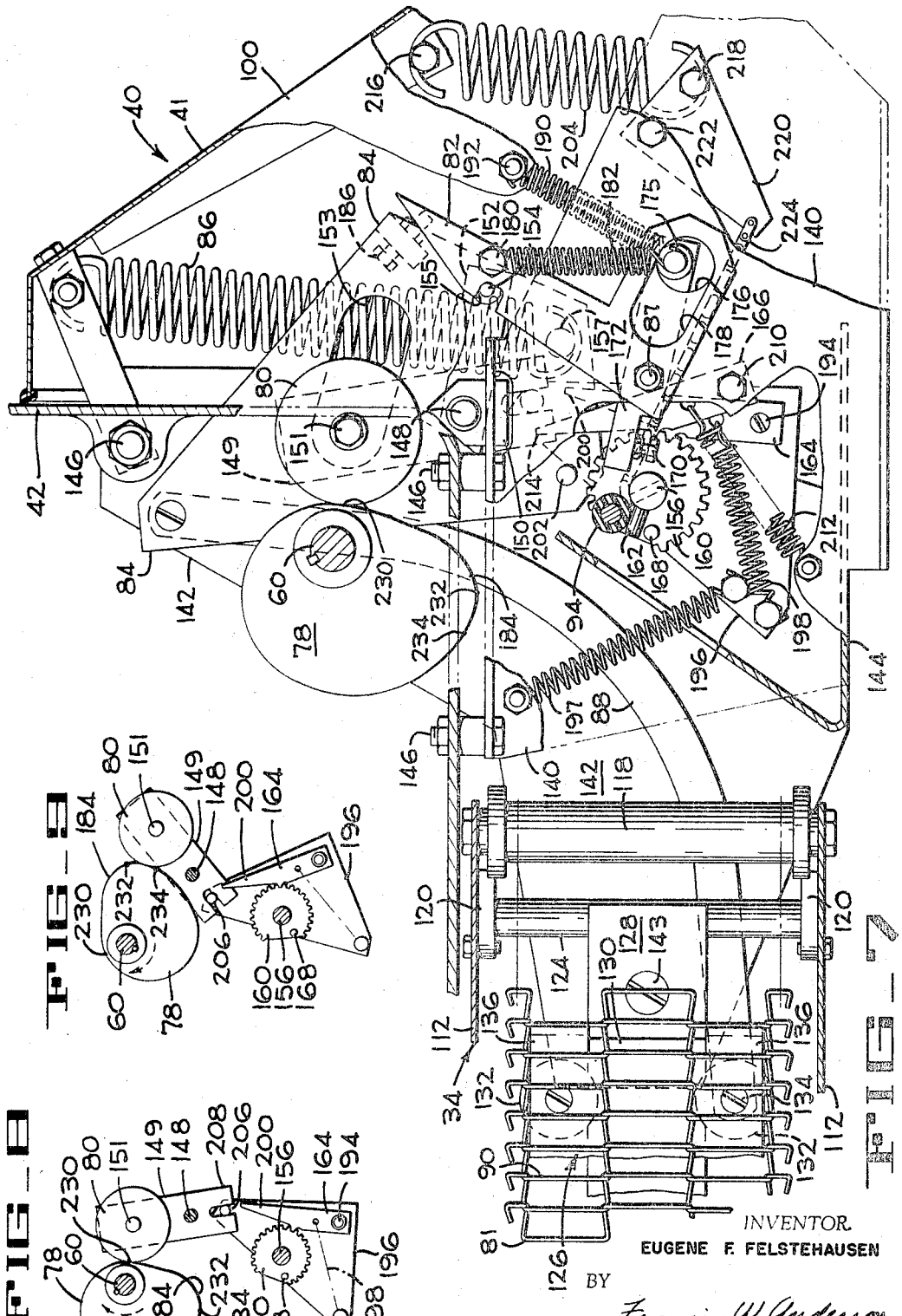

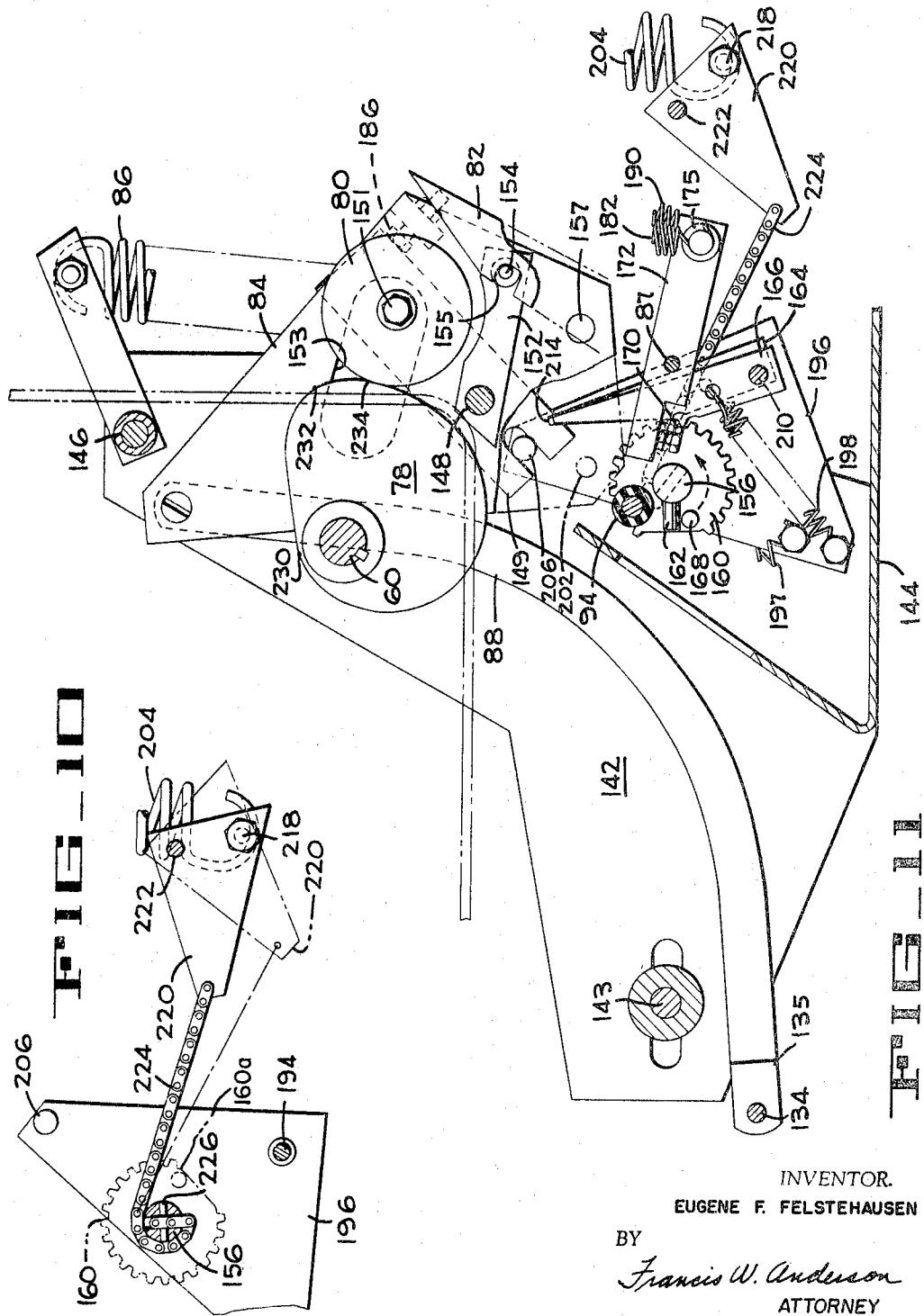

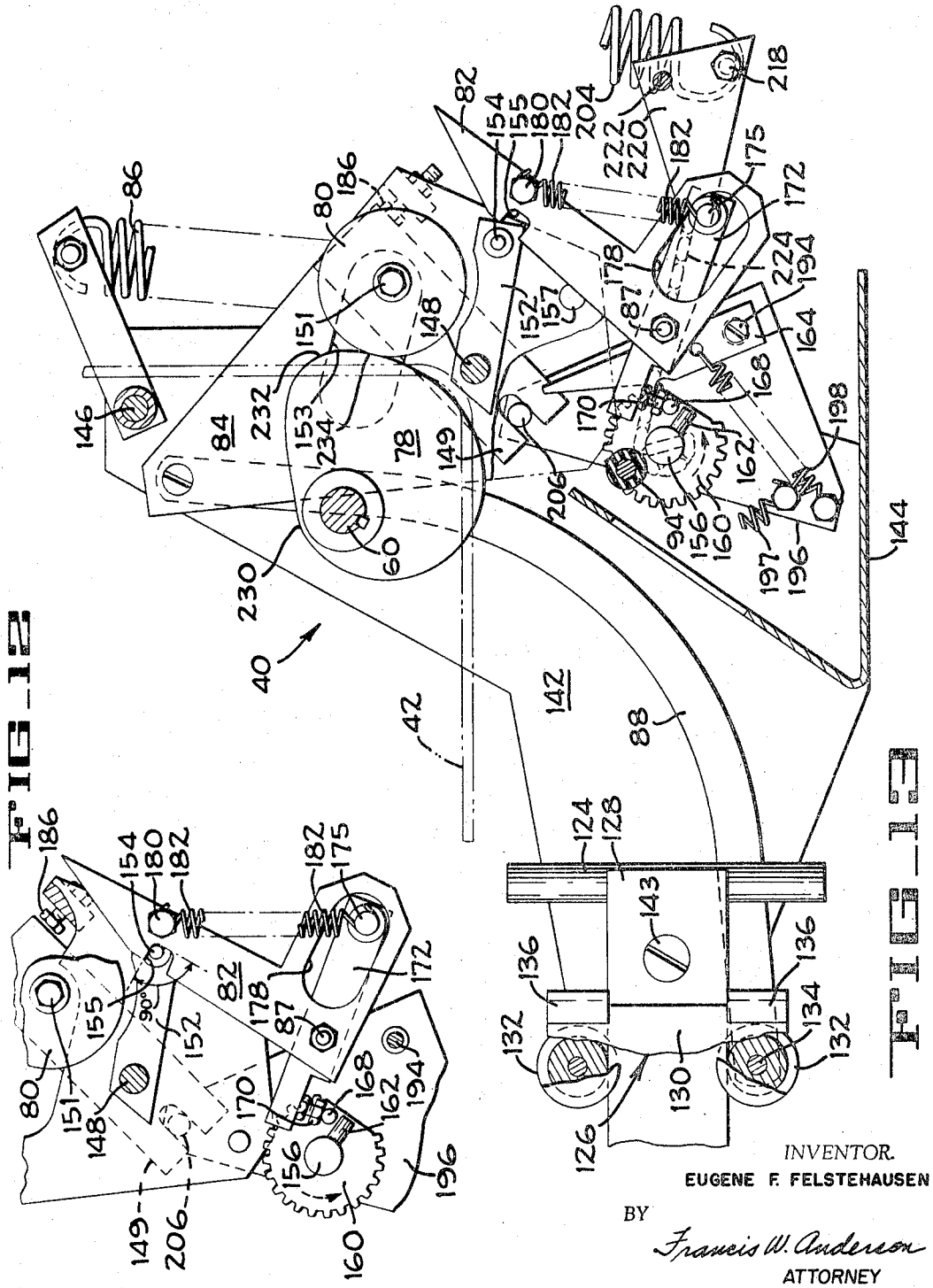

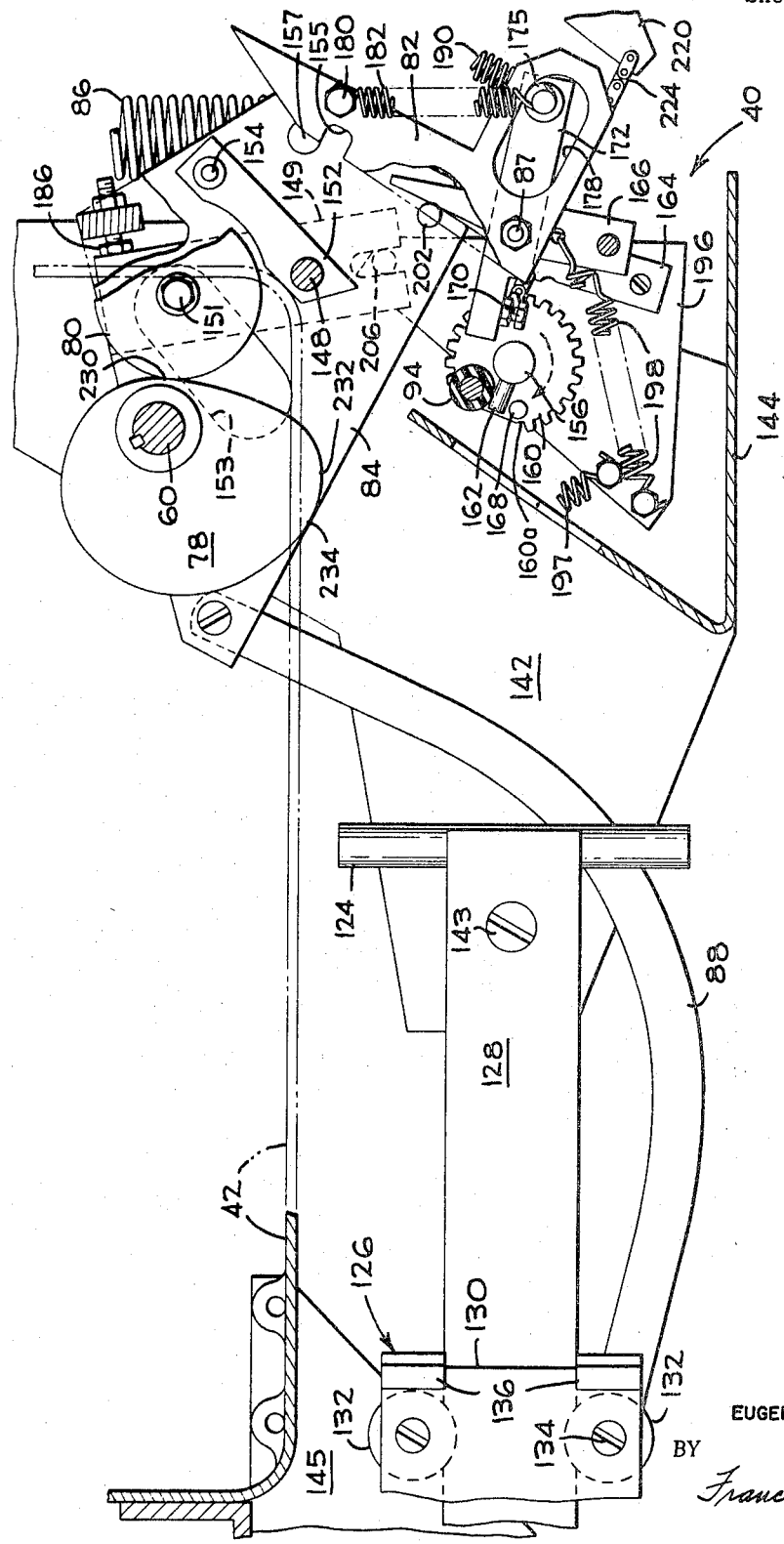

United States Patent Office 3,424,294
Patented Jan. 28, 1969

3,424,294
COUNTER FOR FOOD MOLDING MACHINE
Eugene F. Felstehausen, Vermilion County, Ill., assignor to FMC Corporation, San Jose, Calif., a corporation of Delaware
Filed May 8, 1967, Ser. No. 636,861
U.S. Cl. 198—35       6 Claims
Int. Cl. B65g 57/03, 43/10; G06f 15/20

ABSTRACT OF THE DISCLOSURE

A cam, timed to the discharge of formed meat patties from food molding machine onto a conveyor, indirectly rotates a pawl-controlled counting gear tooth by tooth with each patty discharged onto the conveyor to control the number of patties accumulated into a stack. The counting gear functions to store the control signals and at the completion of a counting cycle releases a pre-conditioned control mechanism which drives a ratchet arm for indexing the conveyor. The ratchet arm is positioned for a driving stroke, after one stack of patties is counted by the gear, by a spring that is tensioned by the cam and associated mechanical linkage, following which the ratchet arm engages the conveyor and is driven by the cam to indirectly reset the counting gear, re-tension the spring, reset the linkages, and index the conveyor for receiving the next stack of patties.

Cross references to related applications

The present invention concerns mechanism illustrated but not claimed in my pending patent applications Ser. Nos. 598,288 and 602,062, both of which applications are assigned to the assignee of the present invention and are incorporated by reference into the present disclosure for further details of the environment of the present invention.

Background of the invention

The general field of art to which the present invention pertains is mechanical counting mechanisms, and more particularly mechanical counting mechanisms arranged to be driven by and control certain operational functions of an associated food processing machine, in the present instance a machine which forms patties of ground meat and stacks the patties with interposed separator sheets.

Prior art devices of the type above mentioned include one molding machine having an electrically operated counter that controls intermittent movement of a take-away conveyor. When one stack of patties has been counted onto the conveyor, it is energized to move the stack aside to permit the formation of a new stack. One disadvantage of electrically or electronically operated counters in meat processing plants is the likelihood of moisture and/or cold interfering with proper operation of the counter, and the attendant disadvantage that repairs or adjustments cannot be effected by mechanically trained maintenance personnel. It is also known that some electrical counter components, such as relays and stepping switches, develop intermittent defects which makes detection of the malfunctioning part difficult, even by skilled technicians. A further shortcoming of electrical counters in the present use is that the machines are usually cleaned with steam or hot water, thus requiring a certain amount of dismantling of the machine or extreme care to prevent damage of the electrical components.

Summary

The present invention provides a counter which functions with positive mechanical actions and is unaffected by its intended environment in a meat processing plant or other locations having high humidity or low temperature, or both. One aspect of the invention is that the counting mechanism pre-positions a conveyor drive arm for a subsequent power indexing movement of the conveyor each time the last patty is discharged from the molding machine onto a stack of patties. While the stack of patties is being formed, a counting gear is rotated tooth by tooth in a known manner by a drive pawl to count the discharge cycles of the molding machine and to tension springs, which at the end of a counting cycle rapidly position the conveyor drive arm for the indexing movement and provide a rapid reset action for the counting gear by rotating the gear back to its initial position. A further concept em-embodied in the invention is a conveyor drive head which is an operative part of the counter and is movable in a plane underlying the conveyor. The drive head has a ratchet engageable with the bottom flight of the conveyor on the return stroke of the drive arm toward the counter. In this way the bottom conveyor flight is pulled in one direction to advance the upper flight of the conveyor in the opposite direction. The upper conveyor flight is thus automatically tensioned to remove any slack and provide an accurate index movement with each drive stroke but more important, this construction permits a quickly demountable conveyor to facilitate cleaning because no permanent interconnections are required between the conveyor and its drive mechanism.

Brief description of the drawings

FIGURE 1 is a perspective of a food molding machine incorporating the counting mechanism and the associated conveying mechanism of the present invention to accumulate the formed patties into stacks having a predetermined number of patties.

FIGURE 2 is a schematic, fragmentary perspective, viewed in the same general direction as FIGURE 1, showing the overall drive train of the food molding machine and the counting mechanism.

FIGURE 3 is a fragmentary plan of the apparatus shown in FIGURE 1.

FIGURE 4 is a vertical section taken along lines 4—4 on FIGURE 3.

FIGURE 5 is an enlarged section taken along lines 5—5 on FIGURE 3.

FIGURE 6 is a fragmentary plan similar to FIGURE 3, but illustrating an optional orientation of the conveyor relative to the food molding machine and the counting mechanism.

FIGURE 7 is an enlarged fragmentary plan of the counting mechanism shown in FIGURE 3, with certain parts removed or broken away.

FIGURES 8 and 9 are schematic plans illustrating the oscillating movement of a part of the FIGURE 7 counting mechanism.

FIGURE 10 is a schematic plan of a counting gear and associated parts shown in a different operational position in FIGURE 7.

FIGURE 1 is a schematic plan similar to FIGURE 7 but illustrating a further step in the operational sequence.

FIGURE 12 is a fragmentary plan of a part of the mechanism shown in FIGURES 7 and 11, and illustrates a further stage of the operational sequence.

FIGURES 13 and 14 are schematic plans similar to FIGURES 7 and 11, and respectively illustrate the last two steps of the operational sequence of the counting mechanism.

Description of the preferred embodiment

Briefly, the present invention is incorporated in a food molding machine 20 (FIG. 1) which has a bulk supply hopper 22 mounted atop a feed hopper 24 for receiving ground meat. The feed hopper is provided with a driven impeller that forces the meat downward into upwardly open pockets, neither the impeller nor pockets being shown, that are part of a rotatable pocket turret 26 having a sector that partially underlies the feed hopper. Overlying another sector of the pocket turret 26 is a rotatable transfer turret 28 that carries a plurality of pick heads 30. The pick heads successively index with the turret pockets, impale the formed meat patties, and carry the patties to a patty discharge station 32 at which a patty is substantially in vertical alignment with the input end of a sack accumulation and discharge conveyor 34. At this point the patty is abruptly discharged downward from the pick head and is intercepted by a releasably supported separator sheet 36 which was previously formed by the severing of a web of material fed from the supply roll R of an interleaver mechanism 38. The separator sheets thus underlie the formed and discharged patties P, and a stack S containing some preselected number of patties between 1 and 20 is formed at the discharge station 32. When one stack is formed, the conveyor moves the stack from the discharge station a distance sufficient to permit the formation of a new stack. The conveyor 34 is controlled and powered by a mechanical counting mechanism 40 (FIG. 3) enclosed in a cabinet 41 (FIG. 1). A dial 43 controls the number count, and both structures 34 and 40 comprise the subject matter of the present invention.

Before proceeding with a detailed description, it should be noted that the food molding machine 20 is of the continuously operated rotary type capable of sustained production rates higher than one formed and discharged patty per second. It will therefore be evident that the counting mechanism 40, and the indexing movement of the conveyor are capable of very rapid action to carry out their respective functions under operating conditions.

Referring now to FIGURE 2, the drive train for the overall machine is mounted in a downwardly open housing 42 and is powered by a motor M, initially by means of a belt and pulley drive connection 44, and then by chain and sprocket drives to maintain timed relation among the various powered shafts. The driven pulley of the drive connection 44 is mounted on a swing arm 46 that is pivotally mounted on a stub shaft 48 and is urged by a tension spring 50 in a direction maintaining the belt taut. Coaxial with the stub shaft 48 is a sleeve 50 which is driven from the belt and pulley drive by a chain and sprocket drive 52.

From sleeve 50, power is transmitted by a chain and sprocket drive 54 to rotate an impeller shaft 56 in counterclockwise direction as viewed from above. The impeller shaft extends upward into the feed hopper 24 (FIG. 1) and drives the previously mentioned impeller blade which pushes the ground meat downward through the feed hopper 24 into the pockets of the pocket turret 26. Also driven in a clockwise direction is a shaft 58 which powers the pocket turret 26. A cam shaft 60 actuates the counting apparatus 40 as well as the interleaver mechanism 38 and other mechanism as described in the previously mentioned pending patent applications. The drive for the cam shaft 60 is effected by a chain and sprocket drive 62 between the impeller shaft 56, the pocket turret shaft 58 and the cam shaft 60. Mounted on the lower end portion of the pocket turret shaft 58 is a sprocket 64 that is meshed with a chain 66. By means of idler sprockets at 68, the chain 66 is trained over the rear sector of a sprocket 70, thereby reversing the drive direction so that the sprocket 70 rotates counterclockwise as viewed from above. The sprocket 70 is secured to a transfer turret sleeve 72 which is rotatable on a fixed shaft 74 and carries the transfer turret 28 (FIG. 1) in a counterclockwise direction. The cam shaft 60 rotates four times the speed of the pocket turret shaft 58. Since the pick heads 30 (FIG. 1) are four in number, one patty P is discharged every one-quarter revolution of the pocket turret shaft 58, and the cam shaft 60 thus rotates one revolution per discharged patty.

FIGURE 3 at 76 shows the centerline path of the pick heads 30 as they are carried by the transfer turret 28 about the axis of the turret shaft 74. The path 76 in the sector approaching the discharge conveyor 34 thus corresponds to the centerline path of the patties moving toward the patty discharge station at 32. A face cam 78 is keyed on the lower end portion of the cam shaft 60 and rotates one complete revolution for each patty discharged from a pick head toward the conveyor 34.

With continued, but only general reference to FIGURE 3, the counting mechanism 40 includes a cam follower roller 80 which is reciprocated by the cam 78 to drive the counting mechanism. After some predetermined number of patties have been accumulated in a stack on an endless wire link belt 81 of the conveyor 34, means including an index hook or index initiator 82 releases a pivotally mounted index arm 84 which is powered by an index arm positioning spring 86. When released, the index arm 84 pivots about its pivot bolt at 87 in a counterclockwise direction and pushes an arcuate conveyor drive arm 88 towards the conveyor 34. This stroke positions the drive arm 88 for a subsequent power stroke, effected by the cam 78 and the follower roller 80, that pulls the lower flight 90 (FIG. 4) of the conveyor belt 81 back toward the counting mechanism 40. In so doing, the upper flight 92 of the conveyor is advanced away from the counting mechanism a distance slightly exceeding the width of a stack of patties and separator sheets, and the same counting and stacking procedure is repeated for a new stack.

The selector dial 43 (FIG. 3) rotatably positions a selector stop 94 about the axis of a selector drum shaft 96 to regulate the number of patties counted into each stack. For this purpose, the shaft 96 depends from a bearing 98 (FIG. 5) that is secured to the underside of a top wall 100 of the cabinet 41. Non-rotatably secured to the bearing 98 is a disc 102 having peripheral detents 104 that are engaged by a spring-loaded ball 106 to releasably maintain the adjusted position of the selector stop 94. Each detent corresponds to one patty.

The ball 106 is mounted in a housing 107 carried by a rotatable cable drum 108, and the stop 94 depends from the cable drum. When actuated, the selector dial 43 rotates the drum 108 to a position indicating a selected count from 1–20 on the selector dial, by a cable drive unit 110 which is supported by the cabinet 41. As will be presently described, the stop 94 lies in a horizontal plane in which it controls the starting position of a counting member which is incrementally rotated step by step in unison with the discharge of patties at the patty discharge station 32.

The discharge conveyor 34, as shown in FIGURES 3 and 4, includes spaced side walls 112 interconnected by suitable tie bars 113 and rotatably mounting, near each end, nylon rollers 118 for supporting the wire conveyor belt 81. Intermediate the rollers 118, the upper conveyor flight 92 is supported on inturned flanges of the side walls 112 to keep the flight planar. Near the upstream top roller 118, each side wall 112 is provided with a C-shaped block 120. Downstream of the blocks 120, similar blocks 122 of inverted U-shape are secured to the side walls. The pairs of blocks 120 and 122 engage fixed support rods 124 and the conveyor assembly 34 rests in place on the rods by gravity, thus permitting rapid demounting and mounting of the conveyor before and after cleaning. When mounted, the lower conveyor flight 90 lies close to a conveyor drive head assembly 126.

The conveyor drive head 126 is mounted for reciprocation along a track 128 that extends between the conveyor support rods 124, and includes a plate 130 carrying grooved rollers 132 that roll along the edges of the track 128. Support means for the track 128 will be presently described. For powering the drive head 126, a pivot shaft at 134 (FIG. 4) of one of the rollers 132 extends through an upwardly offset portion 135 of the conveyor drive arm 88 that is secured at its other end to the index arm 84. The roller mounting plate 130 carries upstanding drive lugs 136 (FIGURES 4 and 7) which are beveled so that they lift but do not move endwise the lower wire belt flight 90 when moving away from the counting mechanism 40. Upon the return or power stroke of the conveyor drive head 126, the wires defining apertures of the lower belt flight 90 straddle the drive lugs 136 and the lower flight 90 is driven toward the counting mechanism to pull the upper flight 92 in the opposite direction.

The counting mechanism 40 (FIGS. 3 and 4) includes an upper support plate 140 and a lower support plate 142 which are rigidly interconnected by means including a vertical wall 144 (FIG. 7) and are bolted to the main housing 42 by bolts 146. One end of the track 128 (FIGS. 3 and 4) is supported by a bolt and spacer 143 secured to the lower support plate 142, and the other end of the track is supported by a bracket 145 that is secured to the main housing 42, and a bolt and spacer 147 interconnecting the bracket and the track. Both the bracket 145 and the lower support plate 142 are provided with slotted portions permitting longitudinal adjustment of the track 128 so that the upstream end of the conveyor 34 just clears the cabinet 41.

FIGURE 6 illustrates an optional orientation of the conveyor 34, in which case the bracket 145 is replaced by a similar bracket 145a, the conveyor drive arm 88 is replaced by a similar drive arm 88a, and the conveyor is pivoted 90 degrees about the bolt and spacer 143. The slotted adjustment provisions for the bolt and spacer 143 allow the conveyor 34 to be so adjusted that its centerline is coincident with the patty discharge station 32, and the conveyor in this position functions in the same manner as in its FIGURE 3 position.

The index arm 84 (FIG. 7), which positions the conveyor drive arm 88 for a driving stroke, is pivoted upon a shaft 148. The shaft depends from a block 150 secured to the upper support plate 140 and projects downward through a pivot arm 149 that carries a stub shaft at 151 for the cam follower roller 80. The shaft 148 also projects through the lower support plate 142. The two extremes of pivotal movement of the index arm 84 are shown in FIGURES 7 and 14. The index arm 84 is provided with an elongate aperture 153 to permit independent pivotal movement of the pivot arm 149 and the index arm 84 under certain operating conditions later described.

A spacer block 152 (FIG. 7) is rigidly mounted on the index arm 84 and at one end provides a bearing surface for the pivot shaft 148. From the other end of the spacer block an index arm restrainer or latch pin 154 projects upward into the path of a notch 155 that is formed in the index hook or index initiator 82. One function of the index hook 82 is to hold the index arm 84 in its FIGURE 7 position by interengaging the pin 154 and a wall of the notch 155 until a selected numerical count of patties is accumulated into a stack, and then to release the index arm 84 to position the drive arm 88 for a subsequent indexing movement of the conveyor. As shown in FIGURE 12, the wall of the notch 155 engaging the latch pin 154 is perpendicular to a line intersecting the center of the pivot bolt 87, for the index hook 82, and the center of the latch pin 154 so that there is no tendency for the index hook to be cammed away from the pin.

Vertically aligned with the selector drum shaft 96 (FIG. 3) is a counting gear shaft 156 (FIG. 7) that is rotatably secured to the lower support plate 142 and is pinned to a spring-biased counting gear 160. The upper end portion of the counting gear shaft 156 has a radially projecting pin 162 that lies in the plane of movement of the selector stop 94 so that the counting gear 160, when the pin 162 and the selector stop 94 are in contact, is in a zero position to begin a counting operation. Each tooth of the counting gear 160 corresponds to one patty discharged onto the conveyor 34, and in a counting operation the gear is rotated counterclockwise from its FIGURE 7 zero position by means including a driving pawl 164 and a locking pawl 166. While the complete counting operation is not at this time described, it should be noted that the zero position of the counting gear 160 varies according to the number selected on the dial 43. In other words, the rotative starting position of the counting gear 160 is different for each number of patties to be counted into a single stack.

When the last patty of a stack has been counted, an upstanding release pin 168 on the counting gear contacts the head of a striker bolt 170 that projects from one end portion of an index hook lockout or release arm 172, thus pivoting the arm 172 about the pivot bolt 87. The pivot bolt is common to the index hook release arm 172 and to the index hook 82, and is mounted on the fixed upper support plate 140. The index hook release arm 172 lies beneath the plate 140 and has an upstanding bumper 175 which projects through an aperture 176 in the support plate 140, and through an elongate slot 178 in the index hook 82. Secured between the bumper 175 and a bolt 180 on the index hook is a tension spring 182. Relative pivotal movement can occur between the index hook release arm 172 and the index hook 82, depending upon where the bumper 175 lies relative to the aperture 176.

Pivotal movement of the index hook release arm 172 in the manner mentioned above tensions the spring 182, but the latch pin 154 remains engaged with the wall of the notch 155 because the force exerted by the drive arm positioning spring 86 to its point of attachment 157 to the index arm 84 tends to urge the latch pin 154 in a path substantially normal to the wall of the notch 155. As will later become evident from the description of the operational sequence and drawings, when the cam 78 is pushing the cam follower roller 80 toward the index hook 82, one end of the pivot arm 149 which carries the roller 80 is moving toward a stop bolt 186 which depends from the conveyor drive plate 84 and lies in the plane of movement of the pivot arm 149. When the pivot arm 149 contacts the stop bolt 186, the index arm 84 is in turn pivoted toward the index hook 82, thereby causing the latch pin 154 to pivot downward away from the wall of the notch 155 with which it has been up to this time engaged.

Since the bumper 175 in its last described position has been moved downward in the aperture 176, the bumper will not at this time prevent clockwise pivotal movement of the index hook 82 about the pivot bolt 87. Accordingly, the tensioned spring 182 pivots the index hook so that the notch 155 lies out of the path of the latch pin 154, and the index arm 84 is pivoted counterclockwise about the shaft 148 by the index arm positioning spring 86. The conveyor drive arm 88 thus drives the conveyor drive head assembly 126 along the track 128 to a position where return movement of the drive head will index the conveyor. A tension spring 190, which is anchored to the bumper 175 and to a bolt 192 that depends from the top wall 100 of the cabinet 41, urges the notched end of the index hook 82 counterclockwise toward the latch pin 154, the wall of the aperture 176 (FIGS. 3 and 7) serving as a stop for the bumper 175. Thus, the index hook 82 and the index arm 84 are pivoted as described during the discharge of each patty, but retain their approximate relative positions until the counting gear release pin 168 pivots the index hook release arm 172 when the last patty of a stack is counted.

As thus far described, it will be seen that the index hook release arm 172 preconditions the index arm 84 for its positioning stroke of the conveyor drive arm 88, but the actual stroke is controlled by the cam 78 that has a precise timed relation with the patty discharge onto the conveyor 34. This latter motion is powered by the index arm positioning spring 86 pivotally urging the index arm 84 counterclockwise while the index arm is retarded by the cam follower roller 80 and the cam 78. After the positioning of the conveyor drive arm 88 for its power indexing stroke when the last patty in a stack is counted, the cam 78 pushes the roller 80 to retract the index arm 84 toward its FIGURE 7 position. The conveyor drive arm 88 thus indexes the conveyor with the power stored in the spring 86, and when the indexing is completed, the next patty drops to start a new stack of patties.

FIGURES 8 and 9 schematically illustrate the basic reciprocatory movement of the patty counting mechanism each time a patty is discharged onto the conveyor 34. Beginning with the zero position shown in FIGURE 8, the counting gear 160 is rotated tooth by tooth counterclockwise during a counting operation by the driving pawl 164. The driving pawl 164 has a single tooth meshed with the counting gear and is pivoted at 194 to a generally triangular latch arm 196. The latch arm 196 is pivotable upon the counting gear shaft 156 and is urged clockwise by a tension spring 197 (FIG. 7). A tension spring 198 urges the driving pawl 164 toward the counting gear and the pawl has an elongate tail portion 200 that lies in the path of movement of a pawl release pin 202.

The pin 202 extends upward from the index arm 84, and when the index arm pivots to its extreme counterclockwise position about the pivot shaft 148, the pawl release pin 202 strikes the tail 200 of the pawl so that its tooth disengages the counting gear 160. The pin 202 also disengages the locking pawl 166 which has a tail portion 214 lying in the path of the pin 202. When both pawls are disengaged, the counting gear 160 is turned clockwise to its FIGURE 7 zero position by a counter reset spring 204 and associated structure which will be presently described.

Returning to FIGURES 8 and 9, the latch arm 196 has an upstanding pin 206 which is driven back and forth by a bifurcated end 208 formed on the pivot arm 149 which carries the cam follower roller 80. With this arrangement, the cam 78 in rotating to the FIGURE 9 position pushes the roller 80 to pivot the arm 149, thus pivoting the latch arm 196 counterclockwise. The driving pawl 164 and the counting gear 160 are thereby moved in the same direction, and the counting gear 160 is driven an angular distance of one tooth.

The locking pawl 166 (FIG. 7) is pivoted upon a bolt 210 to the upper support plate 140, has a tooth engaged with a notch between adjacent teeth of the counting gear and is biased toward such engagement by a spring 212. When the driving pawl 164 advances the counting gear 160, the locking pawl tooth cams out of one notch into the succeeding notch. After the locking pawl 166 and the driving pawl 164 are disengaged by the pawl release pin 202 from the counting gear 160 when the index arm 84 pivots to its extreme counterclockwise position shown in FIGURE 14, the counting gear is returned to its zero position, in which the pin 162 abuts the cable drum stop 94, by the counter reset spring 204 (FIGS. 7 and 10).

Spring 204 is anchored at 216 to the cabinet 41, and at 218 to a crank arm 220 that is pivoted at 222 to the upper support plate 140. A roller chain 224 is secured at one end to the crank arm 220, and its opposite end is anchored in an aperture in the counting gear shaft 156 by a roll pin 226. By this means, the counterclockwise rotation of the counting gear 160 during a counting operation pulls the crank arm 220, via the chain 224, to tension the spring 204. When the pawl release pin 202 strikes the tails of the pawls 164 and 166 in the manner previously mentioned, the counting gear 160 is thus powered by the spring 204 to return to its FIGURE 7 zero position.

Operation

Before the food molding machine 20 (FIG. 1) is put into operation, the selector dial 43 of the counting mechanism is rotated clockwise to place an index mark on the dial opposite a selected number from 1–20 marked on the fixed background of the dial. This causes the cable drum 108 (FIG. 5) to rotate and position the selector stop 94 about the axis of the counting gear shaft 156 (FIG. 7). While moving to such position, the pin 162 of the counting gear shaft is either pushed or released by the selector stop 94, and the counting gear 160 pinned to the shaft 156 is rotated to a position in which the number of notches between adjacent teeth of the gear in the sector between the tooth of the driving pawl 164 and the release pin 168 equals the number indicated by the selector dial 43.

As positioned in FIGURE 7, the counting gear is set to a zero position to begin a count of eleven. If this is the position from which the counting gear is to be reset, a decrease in the number will cause the selector stop 94 to push the pin 162 and rotate the counting gear counterclockwise to its new position. This will pull the chain 224 and add tension to the counter reset spring 204. If an increase in the number count is required, the selector stop 94 is moved in a clockwise direction and the tensioned counter reset spring 204 causes the pin 162 to follow the selector stop. When the counting gear 160 has been thus adjusted, the number of patties P to be discharged into one stack S equals the number of gear notches, counting clockwise from the notch including the tooth of the driving pawl 164 to the notch 160a (FIGS. 10 and 14).

When the motor M (FIG. 2) is energized, formed patties are discharged from the pick heads 30 (FIG. 1) of the continuously rotating transfer turret 28 onto the conveyor 34 at the patty discharge station 32 at rates upwards of 3600 per hour. Accordingly, the maximum time available is one second for tallying each patty by the counting mechanism, and for indexing the conveyor 34 when one stack of patties is completed.

Beginning with the starting position assumed in FIGURE 7, the cam follower roller 80 is on a low point 230 of the cam 78 and the counting gear 160 is set to count out eleven patties per stack. The low point 230 corresponds to the start of the drive stroke of the conveyor drive arm 88, and the end of the positioning stroke of the drive arm. The drop point where a pick head 30 discharges a patty corresponds to a point 232 on the cam 78. Another significant portion of the cam 78 is at a point 234 which marks the end of a drive stroke of the conveyor drive arm 88, and the start of a positioning of the drive arm.

As the cam 78 rotates clockwise from the FIGURE 7 to the FIGURE 11 position, the cam sector intermediate the points 230 and 234 progressively pivots the cam follower roller 80 toward the far end of the aperture 153 in the index arm 84. This pivots the latch arm 196 carrying the driving pawl 164, and rotates the counting gear 160 in a counterclockwise direction. The tooth of the spring-urged locking pawl 166, meanwhile, is cammed by a gear tooth out of the counting gear notch with which it was initially engaged and drops into the next notch. This indexing of the counting gear 160 occurs just prior to the first patty being discharged when the cam point at 232 contacts the roller 80.

The reason for counting the patty before its discharge is that at one portion of a counting cycle the cam sector between the points 230 and 234 indexes the conveyor to reposition a completed stack of patties and make room on the conveyor 34 for a new stack. The separation of the cam points 232 and 234 thus assures that the conveyor is correctly positioned and the patty already counted before the patty is released from the pick head 30. Since the time corresponding to the angular distance between the points 232 and 234 is only about $\frac{1}{17}$ of a second when 3600 patties per hour are being handled, it is essential to index the conveyor 34 (at the end of a counting operation) and to count each patty before it is released, because otherwise normal backlash and wear could disrupt the timing cycle.

In summary of the manner in which the counting gear 160 and associated parts operate, it will be seen that each time a patty is discharged onto the conveyor 34, the cam 78 rotates once and reciprocates the latch arm 196 from the FIGURE 8 position, through the FIGURE 9 position and back to the FIGURE 8 position. During such movement, the counting gear 160 is advanced one notch just before the time the patty is dropped. The pivot arm 149 (FIG. 12) approaches the stop bolt 186 and contacts the bolt 186, as shown in FIGURE 13, to pivot the index arm 84 slightly clockwise about the pivot bolt 87 during each and every patty counting operation. Although this causes the latch pin or index restrainer 154 to disengage the wall of the notch 155 in the index hook or index initiator 82, the index arm 84 will not release to drive the conveyor drive arm 88 until the last count is attained for reasons next described. The above outlined operation, in effect, stores a number count in the counting gear 160 and preconditions the counting mechanism for a driving stroke of the conveyor drive arm 88 when the last number count is achieved, following which the cam 78 retracts the drive arm 88 to index the conveyor 34.

When the stop bolt 186 (FIG. 12) is contacted by the pivot arm 149 during each revolution of the cam 78 to pivot the index arm 84 and thereby relieve the frictional interengagement of the latch pin 154 with the wall of the notch 155, the index hook 82 remains in its FIGURE 7 position in all except the last counting operation because the bumper 175 of the index hook release arm or index initiator lockout 172 is maintained substantially in the FIGURE 7 position by the spring 190. Accordingly, the disengagement of the latch pin 154 with the wall of the notch 155 as the index arm 84 is pivoted rearward by the pivot arm 149 is of only temporary duration, because as soon as the pivot arm 149 moves away from the stop bolt 186 the index arm 84 returns to its FIGURE 7 position in which the wall of the notch 155 engages the latch pin 154 and prevents counterclockwise rotation of the index arm 84 about the pivot shaft 148.

The same counting cycles repeat to rotate the counting gear 160 notch by notch until the last patty (in the present instance the eleventh patty) is counted. At this time the counting gear release pin 168 (FIG. 12) pivots the index hook release arm 172 in a direction tensioning the springs 182 and 190 that are connected to the bumper 175, and moving the bumper toward the other side of the slot 178 in the index hook 82. Since the pivot arm 149 of the roller 80 has not as yet in FIGURE 12 contacted the stop bolt 186 to relieve the frictional engagement of the latch pin 154 with the wall of the notch 155 in the index hook 82, the index arm 84 remains in the position illustrated until the pivot arm 149 strikes the stop bolt 186 as shown in FIGURE 13. As soon as the index arm 84 starts to pivot clockwise as a result of the bolt and pivot arm engagement, the tensioned spring 182 pivots the index hook 82 clockwise until the upper wall of the slot 178 contacts the bumper 175. In this position of the index hook 82, the latch pin 154 is free of the wall of the notch 155.

The index arm 84 is now free to be pivoted by the index arm positioning spring 86 and thus rotates about its pivot shaft 148 in a direction moving the conveyor drive arm 88 to its maximum extended position shown in FIGURE 14. This places the conveyor drive head 126 (FIG. 4) downstream and in position to engage the lower conveyor flight 90. During positioning of the drive arm 88 as described, the nearly linear cam face between the points 230 and 232 provides a very rapid drop off for the cam follower roller 80, thereby causing the conveyor drive arm to quickly attain its FIGURE 14 conveyor driving position.

Near the end of the drive arm positioning stroke of the index arm 84, the pawl release pin 202 contacts the tail portions 200 and 214 of the pawls 164 and 166 so that their teeth disengage the counting gear 160. The tensioned counter reset spring 204 then pivots the crank arm 220, pulling the chain 224 and rotating the counting gear 160 back to its preselected FIGURE 7 zero position in which the pin 162 abuts the selector stop 94 ready for another counting cycle. The cam sector between the points 230 and 234, when the cam 78 is rotating from its FIGURE 14 position back to its FIGURE 7 position for a new counting cycle, pivots the index arm 84 clockwise and retracts the conveyor drive arm 88 so that the drive lugs 136 (see also FIG. 4) engage and pull the lower conveyor flight 90, thus causing the upper conveyor flight 92 to advance the counted stack S of patties downstream a distance slightly greater than the over-all width of the stack. All parts of the counting mechanism 40 are now in their FIGURE 11 positions for the next counting operation, and the same cycle will repeat as long as the food molding machine 20 is in operation.

Although the best mode contemplated for carrying out the present invention has been herein shown and described, it will be apparent that modification and variation may be made without departing from what is regarded to be the subject matter of the invention as set forth in the appended claims.

I claim:

1. In combination with a food molding machine having a driven rotatable turret and a pick head carried by said turret for discharging a molded article each time the head moves past a discharge station along its path of travel, apparatus for forming successive stacks of articles with a predetermined number of articles in each stack comprising an intermittently driven conveyor having a flight arranged for indexing movement and underlying said discharge station for accumulating stacks of articles, a mechanical counting mechanism driven in synchronism with said turret for tallying the movements of said pick head past said discharge station and hence the number or articles released by said pick head and conveyor drive means coupled to said conveyor and powered by said counting mechanism for indexing said conveyor flight after a predetermined number of articles are tallied by said counting mechanism.

2. Apparatus according to claim 1 wherein said turret is continuously rotated, and drive means interconnecting said turret and said counting mechanism for synchronously driving said counting mechanism with the turret so that the article discharge and article tallying operations are continuously repetitive.

3. Apparatus according to claim 2 wherein said drive means is operative, upon the formation of one stack of articles on said conveyor, to index the conveyor for receiving a succeeding stack of articles, and wherein the time interval between the article tallying operations and the conveyor indexing operations are equal so that any time interval can be used for either operation.

4. Apparatus according to claim 1 in which said conveyor comprises an endless perforate belt having a slack lower flight, and said conveyor drive means includes a reciprocable ratchet head underlying said lower flight, said ratchet head having a beveled drive lug aligned with a longitudinal array of belt perforations and operable to slide along the undersurface of said lower flight during one direction of movement of said drive means, and to engage the walls of a perforation to drive said flight in the other direction of movement of said ratchet head.

5. In combination with a food molding machine discharging molded articles from a pick head into stacks having predetermined uniform numbers of articles, a counting mechanism, a drive train powered by said molding machine for driving the counting mechanism in synchronism with said molding machine, said counting mechanism comprising an index restrainer cyclically retracted from a predetermined position in synchronism with the discharge of a molded article from said pick head, an index initiator cyclically restrained from index initiating motion by said index restrainer, an index initiator lockout for also restraining said index initiator during stacking of the articles, and lockout withdrawal and counting means for withdrawing said lockout only upon attainment of a selected count, withdrawal of said lockout thereupon accommodating index initiating motion of said index initiator upon the next cyclic retraction of said index restrainer.

6. In combination with a food molding machine having a driven rotatable turret and a pick head carried by said turret for discharging a molded article each time the head moves past a discharge station along its path of travel, apparatus for forming successive stacks of articles with a predetermined number of articles in each stack comprising conveying means having a flight arranged for indexing motion underlying said discharge station for accumulating stacks of articles, a mechanical counting mechanism coupled to said conveyor, said counting mechanism being driven in synchronism with said turret for tallying the movements of said pick head past said discharge station and for indexing said flight upon attainment of a predetermined count, said counting mechanism including an index restrainer cyclically retracted from a predetermined position in synchronism with the discharge of a molded article from said pick head, an index initiator cyclically restrained from index initiating motion by said index restrainer, an index initiator lockout for also restraining said index initiator during stacking of the articles on said conveyor flight, and lockout withdrawal and selectively positionable counting means for withdrawing said lockout only upon attainment of a selected count, withdrawal of said lockout thereupon accommodating index initiating motion of said index initiator upon the next retraction of said index restrainer.

References Cited

UNITED STATES PATENTS

| | | | |
|---|---|---|---|
| 1,655,804 | 1/1928 | Zuckerman | 93—93 |
| 2,406,726 | 8/1946 | Weimont | 198—40 X |
| 974,648 | 11/1910 | Feeman | 198—35 X |

EDWARD A. SROKA, *Primary Examiner.*

U.S. Cl. X.R.

198—40; 235—132